United States Patent [19]

Danzuka et al.

[11] Patent Number: 4,781,740
[45] Date of Patent: * Nov. 1, 1988

[54] METHOD FOR PRODUCING GLASS PREFORM FOR OPTICAL FIBER

[75] Inventors: Toshio Danzuka; Hiroshi Yokota; Yoichi Ishiguro, all of Yokohama, Japan

[73] Assignee: Sumimoto Electric Industries, Ltd., Osaka, Japan

[*] Notice: The portion of the term of this patent subsequent to Aug. 23, 2005 has been disclaimed.

[21] Appl. No.: 16,354

[22] Filed: Feb. 19, 1987

Related U.S. Application Data

[63] Continuation-in-part of Ser. No. 716,136, Mar. 26, 1985, abandoned.

[30] Foreign Application Priority Data

Mar. 27, 1984 [JP] Japan .................. 59-57273

[51] Int. Cl.$^4$ ........................... C03B 37/018
[52] U.S. Cl. ....................... 65/3.12; 65/18.2; 65/32
[58] Field of Search ................ 65/3.1, 3.11, 3.12, 65/18.2, 32, 11.1

[56] References Cited

U.S. PATENT DOCUMENTS

| | | | |
|---|---|---|---|
| 4,002,512 | 1/1977 | Lim | 65/3.12 X |
| 4,367,013 | 1/1983 | Guerder et al. | 65/3.12 X |
| 4,402,720 | 9/1983 | Edahiro et al. | 65/3.12 |

FOREIGN PATENT DOCUMENTS 2399978 3/1979 France .
2071644 9/1981 United Kingdom .

OTHER PUBLICATIONS

Patent Abstract, Image Fiber, vol. 6, #75 (P-114) (593) May 12, 1982.

Primary Examiner—Robert L. Lindsay
Attorney, Agent, or Firm—Cushman, Darby & Cushman

[57] ABSTRACT

A method for producing a glass preform for an optical fiber comprising jetting $SiCl_4$ as a glass-forming raw material and an insert gas from a first nozzle of a multinozzle burner and, as another glass-forming raw material, at least one hydrogen-containing silicon compound with larger oxidation or hydrolysis reaction heat than that of $SiCl_4$ selected from the group consisting of $SiHCl_3$, $SiH_2Cl_2$, $SiH_3Cl$ and $SiH_4$ from a second nozzle surrounding the first nozzle, flame hydrolyzing or oxidizing the glass-forming raw materials to synthesize glass soot particles, depositing the glass soot particles on a starting member to form a porous soot preform with a controlled bulk density distribution and heating and sintering the soot preform to obtain a transparent glass preform, by which a large glass preform is stably produced without cracking.

8 Claims, 4 Drawing Sheets

METHOD FOR PRODUCING GLASS PREFORM FOR OPTICAL FIBER

REFERENCE TO RELATED APPLICATIONS

This application is a continuation-in-part application of Ser. No. 716,136 now abandoned, issued Mar. 26, 1985.

BACKGROUND OF THE INVENTION

1. Field of the Invention

The present invention relates to a method for producing a glass preform for an optical fiber. More particularly, it relates to a method for producing a glass preform from silicon compounds by means of a multi-nozzle burner.

2. Description of the Prior Arts

The vapor phase axial deposition method (hereinafter referred to as "VAD" method) generally comprises jetting, from a burner, a mixture of a fuel gas, a glass-forming raw material and optionally an additive for adjusting a refractive index of the produced glass preform, flame hydrolyzing the glass-forming raw material to synthesize glass soot particles, depositing the glass soot particles on a rotating starting member to form a porous soot preform and then heating and sintering the porous preform to obtain a transparent glass preform.

In the VAD method, preferably, the fuel gas comprises a mixture of hydrogen and oxygen, the glass-forming raw material comprises $SiCl_4$, and the additive comprises $GeCl_4$, $POCl_3$ or $BBr_3$. To stably produce the large porous soot preform, a bulk density distribution in the soot preform should be adequately adjusted. In the production of the large porous soot preform, difficulties to be overcome are that the periphery of the preform tends to crack due to small bulk density at the periphery, and that since the bulk density distribution has peculiar points, residual stress is generated in the preform, which causes cracking or prevents steady growth of the soot preform.

The bulk density distribution in the porous soot preform varies with a temperature distribution in a stream of the glass soot particles in the flame and influenced by spread of the flame generated by the burner. When the temperature of the glass soot particles is not high enough or when a whole surface of the deposited particles is not heated, the periphery of the soot proform tends to consist of glass soot particles with low bulk density, which causes cracking.

When $SiCl_4$ alone is used as the glass-forming raw material, the glass soot particles are synthesized according to the following equation:

$$SiCl_4 + 2H_2O \rightarrow SiO_2 + 4HCl \tag{I}$$

Although this reaction is exothermic, it should be promoted by heat evolved by the oxyhydrogen flame since its reaction heat is as small as 24 kcal/mol. Thus, the synthesizing rate of the glass soot particles depends on quantity of heat conducted from the flame and, consequently, the temperature distribution in the stream of the fine glass soot particles depends on the heat of the flame. In order to heat the stream of glass soot particles at a sufficiently high temperature, it is necessary to narrow the spread of the flame and to raise a temperature of the flame center. However, if the spread of the flame is narrowed, the whole surface of the deposited glass soot particles is not heated. This is one of the causes of cracking of the large porous soot preform. As understood from the above discussions, not only the whole surface of the deposited glass soot particles should be heated but also the glass soot particles should be heated at a sufficiently high temperature in order to stably produce the large porous soot perform.

SUMMARY OF THE INVENTION

One object of the present invention is to overcome the drawbacks of the conventional outside deposition methods, particularly the VAD method.

Another object of the invention is to provide a method for steadily producing a large glass preform for use in the fabrication of an optical fiber with less cracking by sufficiently raising the temperature of the stream of glass soot particles.

Accordingly, the present invention provides a method for producing a glass preform for an optical fiber comprising jetting $SiCl_4$ as a glass-forming raw material and an inert gas from a first nozzle of a multi-nozzle burner and a hydrogen-containing silicon compound with larger oxidation or hydrolysis reaction heat than that of $SiCl_4$ as another glass-forming raw material from a second nozzle surrounding the first nozzle, flame hydrolyzing and/or oxidizing the glass-forming raw materials to synthesize glass soot particles, depositing the glass soot particles on a starting member to form a porous soot preform with a controlled bulk density distribution and heating and sintering the soot preform to obtain a transparent glass preform.

BRIEF DESCRIPTION OF THE DRAWINGS

FIG. 9 and 10 illustrate the bulk density vs. the $SiHCl_3$ flow rate.

DETAILED DESCRIPTION OF THE INVENTION

The method of the present invention will be explained by making reference to reaction formulas.

Specific examples of the hydrogen-containing silicon compound with larger oxidation or hydrolysis reaction heat than $SiCl_4$ are $SiHCl_3$, $SiH_2Cl_2$, $SiH_3Cl$ and $SiH_4$. The silicon compounds may be used alone or as a mixture thereof. For example, hydrolysis or combustion of $SiHCl_3$ and $SiH_4$ may proceed according to the following equations:

$$SiHCl_3 + H_2O \rightarrow SiO_2 + HCl \tag{II}$$

$$SiH_4 + O_2 \rightarrow SiO_2 + H_2O \tag{III}$$

The reaction heats are 118 kcal/mole and 339 kcal/mole in the hydrolysis of SiHCl$_3$ and the combustion of SiH$_4$, respectively, and both are far larger than heat of hydrolysis of SiCl$_4$ and large enough to continuously proceed the reactions. Therefore, when the hydrogen-containing silicon compound is used as a glass-forming raw material, since it is not necessary to proceed the synthesis of the glass soot particles by the aid of combustion heat of the fuel gas and the glass soot particles can be heated at a sufficiently high temperature, the combustion heat can be used predominantly to heat the surface of the deposited glass soot particles and thus the large porous soot preform is easily produced.

On the contrary, if the porous soot preform is produced only from the hydrogen-containing silicon compound with large oxidation or hydrolysis reaction heat, the temperatures of the glass soot particles and of the flame are raised so high that the bulk density of the porous soot preform becomes partially large. Therefore, the soot preform with smooth bulk density distribution is hardly produced. In addition, if the temperatures are too high, the additive is not adequately added and, in turn, it is difficult to obtain a desired distribution of the refractive index.

Figure 1:
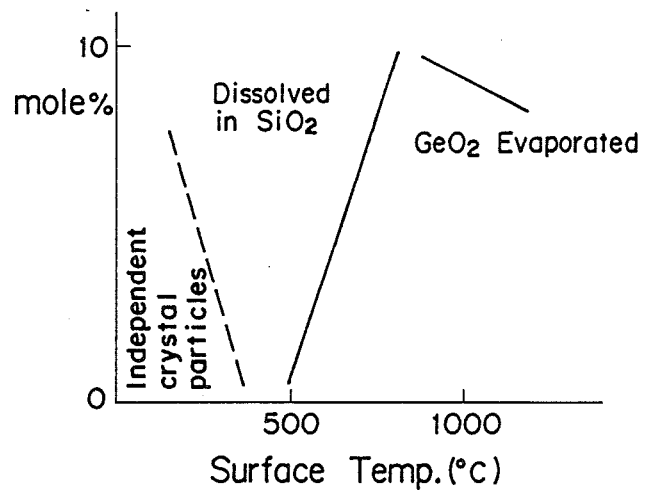
FIG. 1 is a graph showing the relationship between the surface temperature of the deposited glass soot particles and the amount of $GeO_2$ contained in $SiO_2$.

For example, when GeCl$_4$ is used as the additive, the amount of GeO$_2$ contained in SiO$_2$ depends on a temperature of the surface of the deposited glass soot particles as shown in FIG. 1. When the temperature is too high, the amount of GeO$_2$ cannot be increased.

In the method of the present invention, the jetting rates of the fuel gas, the glass-forming raw material and the optionally used additive are substantially the same as in the conventional VAD method. The fuel gas may be jetted from any nozzle of the multi-nozzle burner and/or hydrogen and oxygen may be separately jetted from different nozzles. Further, the glass-forming raw material and/or the additive may be diluted with an inert gas such as helium and argon.

The heating and sintering of the porous soot preform is carried out by a per se conventional manner, for example, at a temperature of 1,300 to 1,700° C., preferably 1,400 to 1,600° C. in an atmosphere of an inert gas (e.g. helium). In the sintering step, an additive (e.g. SF$_6$, CF$_4$, CCl$_2$F$_2$, SiF$_4$, BF$_4$, BCl$_3$, etc.) may be added to adjust the refractive index of the transparent glass preform.

The present invention will be hereinafter explained further in detail by following Examples.

COMPARATIVE EXAMPLE 1

A burner with five coaxially arranged nozzles was used. From the innermost first nozzle, SiCl$_4$, GeCl$_4$, hydrogen and helium were jetted, from the second nozzle surrounding the first one, SiCl$_4$, hydrogen and helium, from the third nozzle surrounding the second one, hydrogen, from the fourth nozzle surrounding the third one, argon, and from the fifth nozzle surrounding the fourth one, oxygen. The glass-forming raw materials and the additive were reacted in the oxyhydrogen flame to synthesize the glass soot particles and deposited on the starting rod rotating at 40 rpm. The jetting rates of the gases were as follows:

| | |
|---|---|
| SiCl$_4$ | 1.5 l/min. |
| 1st nozzle: | 900 ml/min. |
| 2nd nozzle: | 600 ml/min. |
| GeCl$_4$ | 200 ml/min. |
| Hydrogen | 22 l/min. |
| 1st nozzle: | 0.5 l/min. |
| 2nd nozzle: | 1 l/min. |
| 3rd nozzle | 20.5 l/min. |
| Oxygen | 30 l/min. |
| Helium | 2 l/min. |
| 1st nozzle: | 1,500 ml/min. |
| 2nd nozzle: | 500 ml/min. |
| Argon | 3 l/min. |

In this case, the surface of the porous soot preform cracked when its diameter reached 102 mm.

Figure 2:
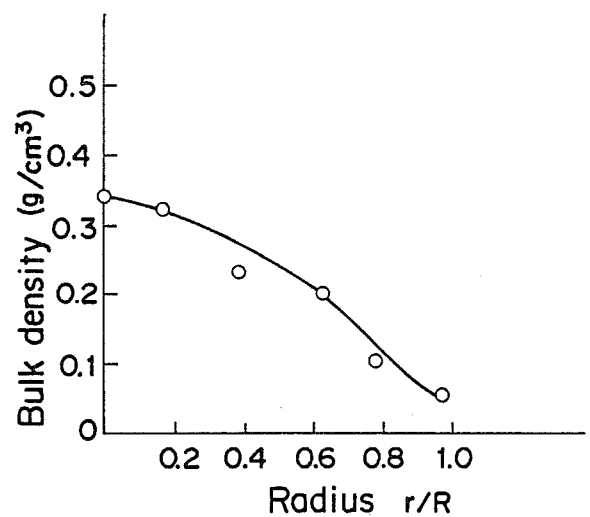
FIGS. 2 and 3 are graphs showing the bulk density distribution of the porous soot preforms produced in Comparative Examples 2 and 3, respectively.

The bulk density distribution of the produced preform was measured and shown in FIG. 2. The bulk density at the central portion was 0.34 g/cm$^3$ but that at the periphery was as low as 0.051 g/cm$^3$.

COMPARATIVE EXAMPLE 2

The same burner as used in Comparative Example 1 was used.

From the innermost first nozzle, SiHCl$_3$, GeCl$_4$ and helium, from the second nozzle, SiHCl$_3$, hydrogen and helium, from the third nozzle, hydrogen, from the fourth nozzle surrounding the third one, argon, and from the fifth nozzle, oxygen. The glass-forming raw material and the additive were reacted in the oxyhydrogen flame to synthesize the glass soot particle and deposited on the starting rod rotating at 40 rpm. The jetting rates of the gases were as follows:

| | |
|---|---|
| SiHCl$_3$ | 1.8 l/min. |
| 1st nozzle: | 1 l/min. |
| 2nd nozzle: | 0.8 l/min. |
| GeCl$_4$ | 200 ml/min. |
| Hydrogen | 13 l/min. |
| 2nd nozzle: | 0.5 l/min. |
| 3rd nozzle: | 12.5 l/min. |
| Oxygen | 30 l/min. |
| Helium | |
| 1st nozzle: | 1.6 l/min. |
| 2nd nozzle: | 0.54 l/min. |
| Argon | 3 l/min. |

In this case, the central portion of the porous soot preform dented.

Figure 3:
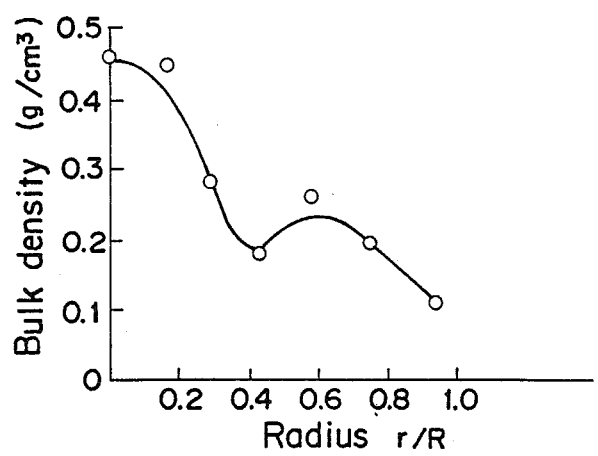

The bulk density distribution of the produced preform was measured and shown in FIG. 3. The bulk density at the central portion was as high as 0.46 g/cm$^3$.

Figure 7:
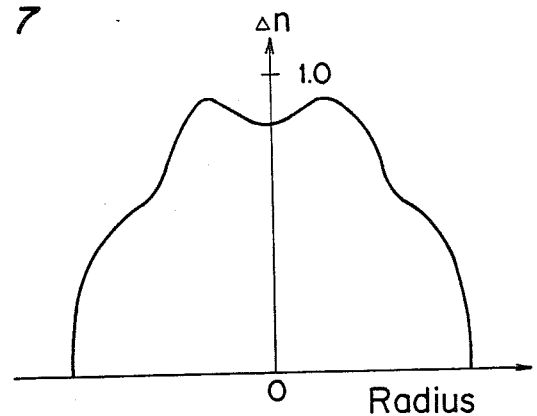
FIGS. 7, 9 and 11 illustrate the exetractive index distribution of various preforms.

The refractive index distribution of the produced preform was not smooth and had a dent at the centeral portion of the preform as shown in FIG. 7.

COMPARATIVE EXAMPLE 3

The same burner as used in Comparative Examples 1 and 2 was used.

From the innermost first nozzle, SiCl$_4$, SiHCl$_3$, helium and GeCl$_4$ were jetted, from the second nozzle, SiCl$_4$, SiHCl$_3$, hydrogen and helium, from the third nozzle, hydrogen, from the fourth nozzle, argon, and from the fifth nozzle, oxygen. The glass-forming raw materials and the additive were reacted in the oxyhydrogen flame to synthesize the glass soot particle and deposited on the starting rod rotating at 40 rpm. The jetting rates of the gases were as follows:

| | |
|---|---|
| GeCl$_4$ | 200 ml/min. |
| Hydrogen | 13 l/min. |
| 2nd nozzle: | 0.5 l/min. |
| 3rd nozzle: | 12.5 l/min. |

-continued

| | |
|---|---|
| Oxygen | 30 l/min. |
| Argon | 3 l/min. |

The jetting rates of SiCl₄, SiHCl₃ and helium were varied with adjusting the ratio of SiCl₄ and SiHCl₃ so as to keep the total amount of synthesized $SiO_2$ constant as shown in following Table:

TABLE

| Condition | First nozzle (l/min) | | | Second nozzle (l/min) | | |
|---|---|---|---|---|---|---|
| | $SiCl_4$ | $SiHCl_3$ | He | $SiCl_4$ | $SiHCl_3$ | He |
| I | 0.8 | 0.2 | 1.6 | 0 | 0.8 | 0.54 |
| II | 0.6 | 0.4 | 1.57 | 0 | 0.8 | 0.54 |
| III | 0.4 | 0.6 | 1.54 | 0 | 0.8 | 0.54 |
| IV | 1 | 0 | 1.6 | 0.8 | 0 | 0.7 |
| V | 1 | 0 | 1.6 | 0.4 | 0.4 | 0.48 |
| VI | 1 | 0 | 1.6 | 0 | 0.8 | 0.54 |

The effects of co-supply of $SiCl_4$ and $SiHCl_3$ from the first nozzle can be seen from the results obtained under Conditions I, II and III as well as those of Comparative Examples 1 and 2.

Figure 8:
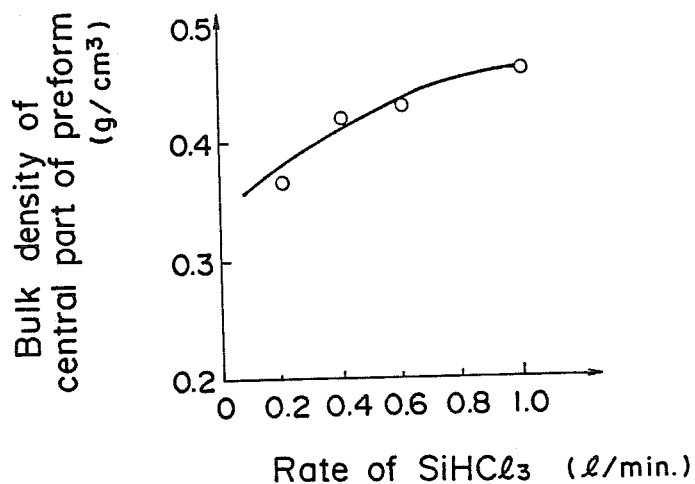

As shown in FIG. 8, the bulk density of the central portion of the produced preform increased as the jetting ratio of $SiHCl_3$ to that of $SiCl_4$ from the first nozzle was increased. In FIG. 8, the result of Comparative Example 2 in which no $SiCl_4$ was jetted from the first nozzle is also plotted.

Figure 9:
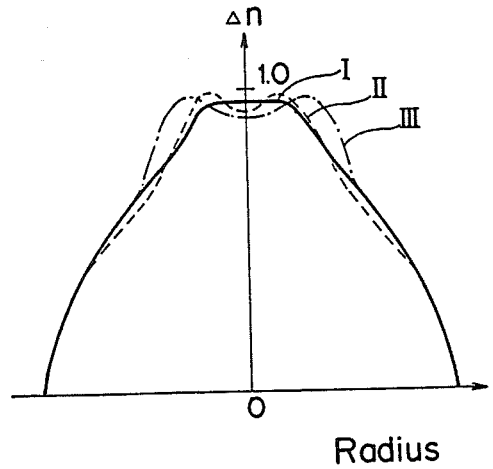

The refractive index distribution of the preforms varied according to the jetting ratio of $SiHCl_3$ as shown in FIG. 9. In the distribution curves, dents were generated at the central portion of the preform due to supply of $SiHCl_3$ so that the distiribution curves were not smooth. The reason for this may be that the temperature at the central portion during synthesis and deposition of the glass soot particles was raised too high because of high reaction heat of $SiHCl_3$.

The effects of co-supply of $SiCl_4$ and $SiHCl_3$ from the second nozzle can be seen from the results obtained under Conditions IV, V and VI.

Figure 10:
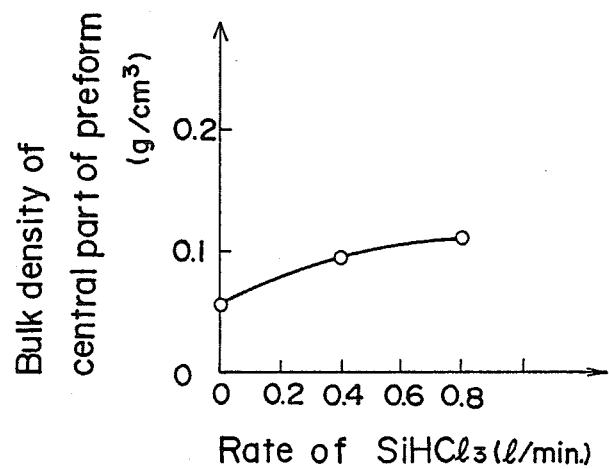

As shown in FIG. 10, the bulk density of the peripheral portion of the preforms increased as the jetting ratio of $SiHCl_3$ increased so that a harder preform could be produced. By the addition of $SiHCl_3$, cracking of the surface of the preform was prevented.

EXAMPLE

The same burner as used in Comparative Examples 1 and 2 was used.

Figure 4:
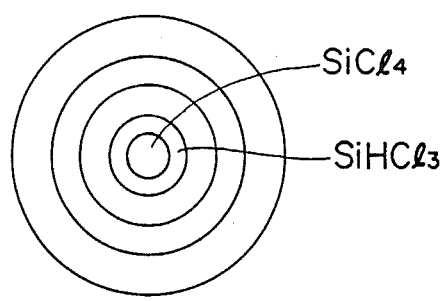
FIG. 4 shows one embodiment of the arrangement of the nozzles of the burner to be used in the method according to the present invention.

As shown in FIG. 4, from the innermost first nozzle, SiCl₄, GeCl₄, hydrogen and helium were jetted, from the second nozzle, SiHCl₃, hydrogen and helium, from the third nozzle, hydrogen, from the fourth nozzle, argon, and from the fifth nozzle, oxygen. The glass-forming raw materials and the additive were reacted in the oxyhydrogen flame to synthesize the glass soot particle and deposited on the starting rod rotating at 40 rpm. The jetting rates of the gases were as follows:

| | |
|---|---|
| SiCl₄ | 1 l/min. |
| SiHCl₃ | 0.8 l/min. |
| GeCl₄ | 200 ml/min. |
| Hydrogen | 20 l/min. |

-continued

| | |
|---|---|
| 1st nozzle: | 0.5 l/min. |
| 2nd nozzle: | 1 l/min. |
| 3rd nozzle: | 18.5 l/min. |
| Oxygen | 30 l/min. |
| Helium | |
| 1st nozzle: | 1.8 l/min. |
| 2nd nozzle: | 0.55 l/min. |
| Argon | 3 l/min. |

In this case, a porous preform of 132 mm in diameter and 55 cm in length was steadily produced.

Figure 5:
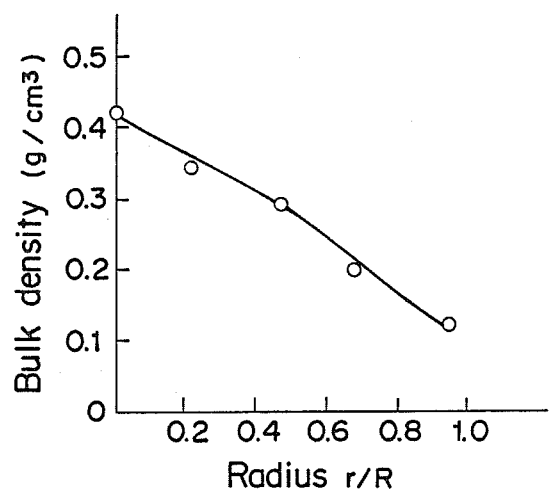
FIG. 5 is a graph showing the bulk density distribution of the porous soot preform produced in Example of the invention.

The bulk density distribution of the produced preform was measured and shown in FIG. 5. The bulk density was smoothly distributed from the central portion with 0.41 to the periphery with 0.11 g/cm³.

Figure 11:
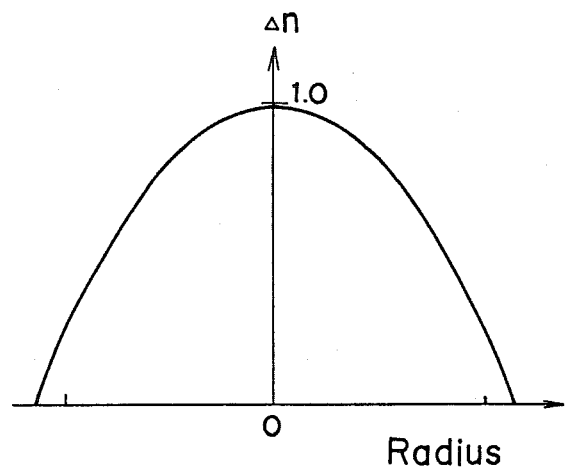

The refractive index distribution of the produced preform was smooth as shown in FIG. 11.

When one of other hydrogen-containing silicon compound is used in place of $SiHCl_{13}$, substantially the same results may be achieved.

Figure 6:
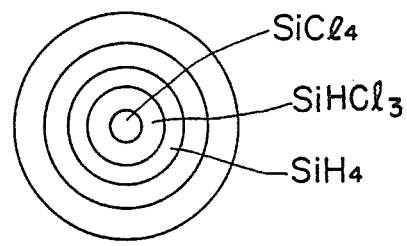
FIG. 6 shows another embodiment of the arrangement of the nozzles of the burner to be used in the method according to the present invention.

Furthermore, at least one of the hydrogen-containing silicon compounds may be jetted from the second nozzle and at least one other compound may be jetted from the third nozzle, for example, as shown in FIG. 6.

The present invention has been described in detail with reference to the specific embodiments, particularly to the VAD method, it will be apparent to those skilled in the art that the method of the invention may be applied to other method for producing a glass preform for an optical fiber, for example, the outside vapor phase deposition method.

What is claimed is:

1. A method for producing a glass preform for an optical fiber comprising steps of:
   jetting SiCl₄ as a glass-forming raw material and an inert gas from a first nozzle of a multi-nozzle burner and, as another glass-forming raw material, at least one hydrogen-containing silicon compound with larger oxidation or hydrolysis reaction heat than that of SiCl₄ selected from the group consisting of SiHCl₃, SiH₂Cl₂, SiH₃Cl and SiH₄ from a second nozzle surrounding the first nozzle,
   flame hydrolyzing and/or oxidizing the glass-forming raw materials to synthesize glass soot particles,
   depositing the glass soot particles on a starting member to form a porous soot preform with a controlled bulk density distribution and
   heating and sintering the soot preform to obtain a transparent glass preform.

2. The method according to claim 1, wherein the inert gas is helium or argon.

3. The method according to claim 1, wherein an additive for adjusting a refractive index of glass is further jetted from the first nozzle.

4. The method according to claim 3, wherein the additive is GeCl₄.

5. The method according to claim 1, wherein hydrogen is further jetted from the first nozzle.

6. The method according to claim 3, wherein hydrogen is additionally jetted from the first nozzle.

7. The method according to claim 4, wherein hydrogen is additionally jetted from the first nozzle.

8. A method according to claim 1, wherein SiHCl₃ is jetted from the second nozzle and SiH₄ is jetted from a third nozzle surrounding the second nozzle.

* * * * *